March 10, 1936.    B. DARROW    2,033,882
RIM FOR VENTING TIRES
Filed Oct. 29, 1931    2 Sheets-Sheet 1
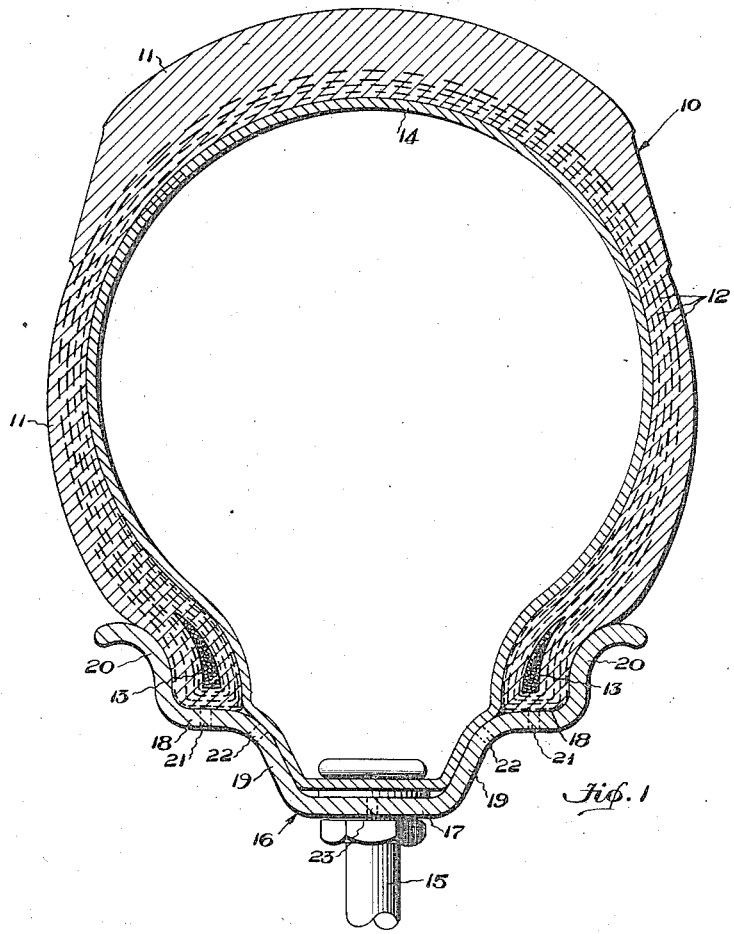
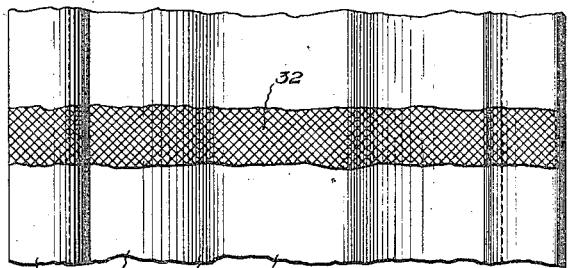
Inventor
Burgess Darrow Inventor
Burgess Darrow By Attorney Patented Mar. 10, 1936

2,033,882

UNITED STATES PATENT OFFICE 2,033,882

RIM FOR VENTING TIRES

Burgess Darrow, Akron, Ohio, assignor to Wingfoot Corporation, Wilmington, Del., a corporation of Delaware Application October 29, 1931, Serial No. 571,728

7 Claims. (Cl. 152—20)

This invention relates to the venting of a unit comprised of a tire, tube and rim, and more particularly to the construction of a rim for venting the unit whereby air or other fluids contained in the unit can be vented therefrom under certain conditions.

Heretofore it has been customary in building pneumatic tires to provide a tire, which, when mounted on a rim and inflated, is practically impervious to gases, and which will not permit the escape of any fluid contained therein. Likewise, it has been customary to provide an impervious rim for this impervious tire. Inflation of the tire on the rim is usually accomplished by means of a separate inflatable inner tube disposed therein, or by means of an inner tube permanently secured or formed integrally with the inner wall of the tire in a structure known as a single tube tire.

In using this impervious tire and rim on a vehicle, numerous obstacles have been encountered. For example, there is a natural seepage of the inflating fluid through the inner tube and into the carcass of the tire and the latter being impervious does not permit the escape of this seeping fluid. The impervious rim also prevents escape of this fluid and as a consequence, the fluid permeates the cords of the carcass and tends to flow along and through these cords, but as the fluid cannot escape through the relatively thick, rubber sidewalls or tread portion of the tire, it forms blisters in the rubber of the sidewalls and tread and frequently causes blowouts at these points. Likewise, tubes occasionally have small holes, such as pin holes therein, through which the fluid passes into the carcass and similar troubles occur.

I have discovered that, if some means is provided to permit the escape to the atmosphere of fluids contained within or entering into the carcass of the tire, or to permit the escape of fluids from the unit after they have seeped or leaked through the tube and before they enter the carcass, many, if not all, of the troubles incident to the action of such fluids will be overcome. In the copending application of R. B. Day, Serial #561,122, filed September 4, 1931, this fluid is permitted to escape to the atmosphere by venting the tire, but in my invention I permit the escape of the fluid by venting the rim.

Accordingly, it is an object of this invention to provide a vented rim for a pneumatic tire which will permit the escape to the atmosphere of the detrimental fluids previously referred to.

Another object is to provide a novel rim for a pneumatic tire which is provided with vent passages at points suitably located to vent the tire under certain conditions.

A further object is to provide a novel rim of the drop center type which is provided with vent passages of the character referred to.

A further object is to provide novel means for venting a unit comprised of a tire, tube and rim.

Other objects and advantages will become apparent from the following description, in conjunction with the accompanying drawings, wherein I have shown several embodiments of the invention, and wherein:

Fig. 1 is a cross-section of an assembled tire, tube and rim, the rim being vented in accordance with my invention;

Fig. 5 is a fragmentary plan view of a portion of a rim showing a modified form of the invention.

Figure 2:
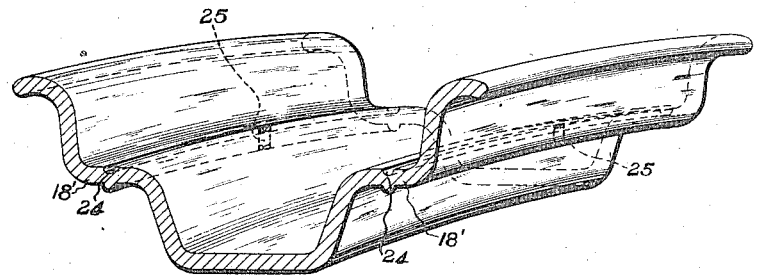
Fig. 2 is a perspective view of a portion of the rim showing a modified form of the invention.

Referring to the drawings, it will be seen that a tire, designated generally by the numeral 10, and of conventional construction, comprises an outer layer of rubber compound 11 forming the tread and sidewalls of the tire, and a plurality of layers or plies 12 of rubberized cord fabric or other fibrous material. These plies, at their margins, enclose bead rings 13 which preferably are composed of a plurality of relatively small wires that are at least partially embedded in rubber compound. It will be understood that the tire is also provided with a breaker strip, chafing strips, and any other portions needed to complete the structure, but these need not be referred to in order to understand the invention.

The tire 10 is provided with an inflated inner tube 14 which may be separable therefrom or which may be formed as an integral part thereof. A conventional valve 15 is carried by the inner tube to permit inflation and deflation of the latter.

The tire and tube are mounted on a rim indicated as a whole by the numeral 16. This rim comprises an inner annular portion 17 provided with the usual opening for receiving the valve 15, annular bead receiving portions 18 connected to the portion 17 by annular connecting portions 19, and annular flanges 20.

The elements described, when of conventional construction and when assembled in a unit for use on a vehicle, do not ordinarily permit the escape of fluid which seeps or leaks through the inner tube, because the tire is impervious due to the relatively thick rubber sidewalls and tread portion, the rim is impervious and a fluid tight connection is formed between the rim and tire when the latter is inflated. In order to prevent blister formation in the tire and blowouts caused by leakage and seepage of fluids into the carcass, or by fluids already present in the carcass, I provide one or more passageways in the rim at desirable points to vent these fluids from the unit under certain conditions to permit their escape to the atmosphere.

For example, in Fig. 1, I have provided one or more vent passages 21 in the bead receiving portions 18 of the rim, one or more vent passages 22 in the connecting portions 19 and one or more vent passages 23 in the inner annular portion 17. Fluid contained in the carcass or which seeps or leaks thereinto will pass along and through the cords of the carcass into the region of the beads and will puncture through the thin layer of rubber which normally is disposed about the beads, through the openings 21 to the atmosphere. In some instances, the fluid which seeps or leaks through the tube may find its way to the vicinity of the openings 22 and 23 and will escape through these openings before it has a chance to enter the carcass. While I prefer to provide the rim with one or more openings in each of the portions as shown in Fig. 1, it will be apparent that only the openings 21 need be provided if desired, as these latter openings alone will effectively permit the escape of detrimental fluids.

In Fig. 2, I have shown a modified rim construction in which either or both of the bead receiving portions 18' are provided on their outer surfaces with a circumferential vent groove or passage 24 having one or more substantially radial passages 25 communicating therewith and with the atmosphere. In this form of the invention fluid also will be permitted to puncture through the thin rubber layer surrounding the beads into the grooves 24 and passages 25.

Figure 3:
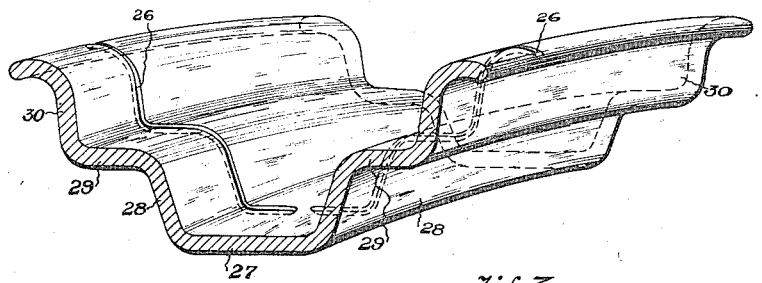
Figs. 3 and 4 are similar views each showing a modified form of the invention.

As shown in Fig 3, I can provide the rim with one or more transversely extending vent grooves or passages 26, which preferably extend at least partially across the inner annular portion 27, across the connecting portions 28, across the bead receiving portions 29 and across the flanges 30. In this form of the invention, fluids which puncture through the thin layer of rubber about the beads of the tire or which enter the grooves 26 after leaking or seeping from the tube and before entering the carcass, will pass along the grooves over the rim flanges to the atmosphere.

Figure 4:
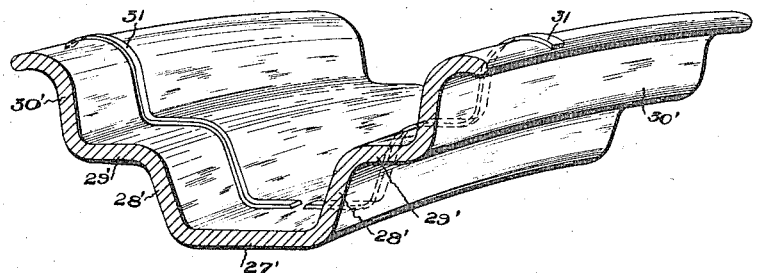

A similar result will be obtained from the structure shown in Fig. 4, in which one or more transversely extending ridges 31 are provided, which ridges preferably extend in a manner similar to the grooves 26, whereby to provide a vent passage on each side of the ridges. It will be apparent that in this form of the invention the fluid will be vented from the tire in substantially the same manner as described in connection with the form shown in Fig. 3.

The embodiment shown in Fig. 5, illustrates one or more transversely extending knurled or roughened portions 32, which preferably extend across on the upper surface of the rim from flange to flange, whereby to provide a series of continuous ridges and grooves to permit the venting of fluids from the tire in a manner similar to that described in connection with Fig. 3.

I have illustrated my invention as being particularly adapted for use with a rim of the drop center type and it is preferred that the invention be utilized with this type rim, but it will be obvious that the invention is equally applicable to substantially any type rim.

It is believed to be apparent that I have provided novel means which will permit the passage of detrimental fluids, from the carcass or from the interior of the tire after the fluids have escaped from the tube, to the atmosphere.

Although I have illustrated several forms of the invention, it will be apparent to those skilled in the art that the invention is not limited to such forms but that various modifications may be made without departing from the spirit of the invention or from the scope of the sub-joined claims.

What I claim is:

1. A rim for a pneumatic tire having an inflated member arranged therein, said rim being provided with one or more vent passages communicating directly with the tire adjacent its bead portion and directly with the atmosphere, and being further provided with one or more vent passages communicating directly with said inflatable member and directly with the atmosphere.

2. A drop center rim for a pneumatic tire provided with an inner annular portion to receive the inner portion of an inflatable member arranged in the tire, and outer bead receiving portions connected to said inner portion, each of said portions being provided with one or more vent passages communicating directly with the atmosphere, directly with the tire adjacent its bead portions and directly with the inflatable member.

3. A drop center rim for a pneumatic tire provided with an inner annular portion, outer bead receiving portions connected to said inner portion, and flanges carried by said bead receiving portions, said inner portion, said bead receiving portions and said flanges being provided with one or more vent passages extending transversely of the width thereof.

4. A pneumatic tire rim provided with one or more vent grooves extending transversely of the width of the rim on the surface thereof that is engaged by a tire, the said groove or grooves having its or their outer end or ends communicating directly with the atmosphere so as to provide a permanent passageway or passageways between the atmosphere and at least the bead portion of a pneumatic tire when the latter is inflated on the rim.

5. A drop center rim for a pneumatic tire provided with an inner annular portion and outer bead receiving portions connected to said inner portion, at least one of said bead receiving portions being provided with one or more vent passages extending transversely of the width thereof to provide a permanent passageway or passageways between the atmosphere and at least the bead portion of a pneumatic tire when the latter is inflated on the rim.

6. A drop center rim for a pneumatic tire provided with an inner annular portion and outer bead receiving portions connected to said inner portion, at least one of said bead receiving portions being provided with one or more vent grooves extending transversely of the width thereof to provide a permanent passageway or passageways between the atmosphere and at least the bead portion of a pneumatic tire when the latter is inflated on the rim.

7. A pneumatic tire rim provided with one or more vent passages extending transversely of the width of the rim on the surface thereof that is engaged by a tire, said passage or passages having its or their outer ends communicating directly with the atmosphere so as to provide a permanent passageway or passageways between the atmosphere and at least the bead portion of a pneumatic tire when the latter is inflated on the rim.

BURGESS DARROW.